United States Patent [19]

Sogawa

[11] Patent Number: 5,089,758
[45] Date of Patent: Feb. 18, 1992

[54] ROBOT CONTROL PROCESS

[75] Inventor: Kenji Sogawa, Hirakata, Japan

[73] Assignee: Matsushita Electric Industrial Co., Ltd., Osaka, Japan

[21] Appl. No.: 548,591

[22] Filed: Jul. 5, 1990

[30] Foreign Application Priority Data

Jul. 11, 1989 [JP] Japan .................................. 1-179559

[51] Int. Cl.$^5$ ............................................. G05B 19/25
[52] U.S. Cl. ................................... 318/603; 318/571; 318/616
[58] Field of Search .................... 318/568.22, 603, 610, 318/616, 618, 638, 560–638

[56] References Cited

U.S. PATENT DOCUMENTS

| | | | |
|---|---|---|---|
| 4,533,991 | 8/1985 | Georgis | 318/638 |
| 4,647,826 | 3/1987 | Ota | 318/603 |
| 4,810,945 | 3/1989 | Yoneda et al. | 318/616 |

*Primary Examiner*—Paul Ip
*Attorney, Agent, or Firm*—Stevens, Davis, Miller & Mosher

[57] ABSTRACT

A direct-drive robot is controlled by a process in which a digital positional deviation value (between a command value and a value delivered from an encoder for detecting the motion of a movable part to be controlled in the robot) is increased or decreased in accordance with a result of comparison of the digital positional deviation value with a threshold value before the digital positional deviation value is converted to an analog value, and the analog value is then amplified by a gain depending upon the result of the comparison of the digital positional deviation with the threshold value. This enhances the servo rigidity, restrains slight vibrations during a stopping operation of the robot, and achieves smooth operation during a moving operation of the robot.

2 Claims, 4 Drawing Sheets

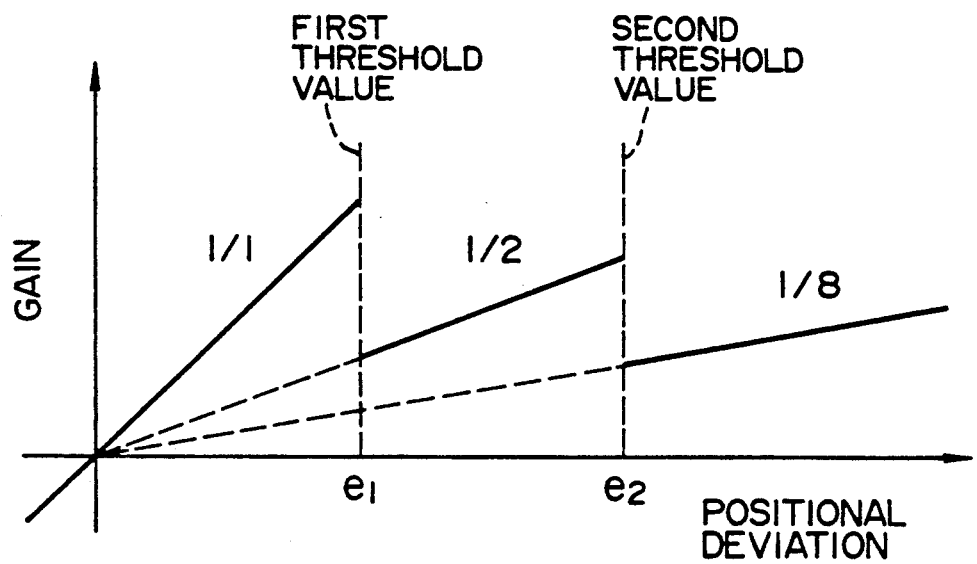
F I G. 3

ROBOT CONTROL PROCESS

BACKGROUND OF THE INVENTION

1. Field of the Invention

The present invention relates to a process of controlling a direct-drive robot.

2. Statement of the Related Art

Recently, various kinds of robots have been used in automated factories, and in particular, direct-drive robots have been developed in order to satisfy the demands of high speed and high accuracy.

Referring to FIG. 5 which shows a block diagram of a control system used with respect to a conventional robot as one example, a position command section 1 delivers a command value to a subtractor 3 which then subtracts a value delivered from an up-down counter 2, from the command value. The result of the subtraction is delivered to a DA converter 5 which converts the same into an analog value that is then amplified by an amplifier 6. The amplified value is then applied to a speed instructing type motor drive 7 for controlling a motor 8 which therefore runs at a speed proportional to the output of the amplifier 6.

However, with the use of the above-mentioned conventional arrangement for controlling a direct-drive robot arm, it has been necessary to increase the a gain of the amplifier in order to enhance the servo rigidity thereof if the arm is in a stop condition in which the positional deviation is small, resulting in generation of a slight vibration. Also, upon deceleration or acceleration which causes the positional deviation to be large due to follow-up deviation, the gain has been decreased so as to avoid overflow of the DA converter, resulting in lowering the positional accuracy.

SUMMARY OF THE INVENTION

Accordingly, the present invention is devised in order to resolve the above-mentioned conventional problems, and therefore, it is an object of the present invention to provide a robot control process which realizes an enhancement of the servo rigidity and restraint of slight vibrations as well realization of smooth operation during movement.

To this end, according to the first aspect of the present invention, there is provided a process of controlling a robot, comprising the steps of converting a digital value which is obtained by increasing a positional deviation (for example, multiplying the positional deviation with an integer number) into an analog value if the positional deviation is in a range where it is small, and amplifying the analog value after the DA conversion with an analog gain which is decreased (for example, by dividing the original analog gain with a predetermined value) so as to obtain a speed instruction value, while converting a value which is obtained by decreasing the positional deviation (for example, dividing the positional deviation with a predetermined number) into an analog value if the positional deviation is in a range where it is large, and amplifying the analog value after the DA conversion with a gain which is increased (for example, by multiplying the original analog gain with a certain number) so as to obtain a speed instructing value.

According to the second aspect of the present invention, there are provided, in addition to the arrangement in the first aspect of the present invention, two sinusoidal wave signals (A, B), respectively having phases with 90 deg. phase difference, which are obtained as outputs from the encoder, and these signals are then combined in several ways such as, A + B, −A + B, A − B, −A − B in an analog computing section so as to add the result of the combination to the above-mentioned speed instructing value in accordance with a condition of both sinusoidal signals if the positional deviation is in the small value range.

In view of the above-mentioned processes according to the present invention, in which a digital value obtained by increasing the positional deviation is converted into an analog value that is then amplified by a decreased gain, thereby to enhance the servo rigidity with no generation of slight vibrations if the positional deviation is in a small value range. Also, a digital value obtained by decreasing the positional deviation is converted into an analog value that is then amplified by an increased gain. This makes it possible to avoid overflow of the DA converter while maintaining the positional accuracy if the positional deviation is in a large value range.

The present invention will be described as to various embodiments form with reference to the drawings in which:

BRIEF DESCRIPTION OF THE INVENTION

FIG. 3 is a graph explaining the content of a memory table used in the control systems shown in FIGS. 1 and 2;

DESCRIPTION OF THE PREFERRED EMBODIMENTS

Figure 1:
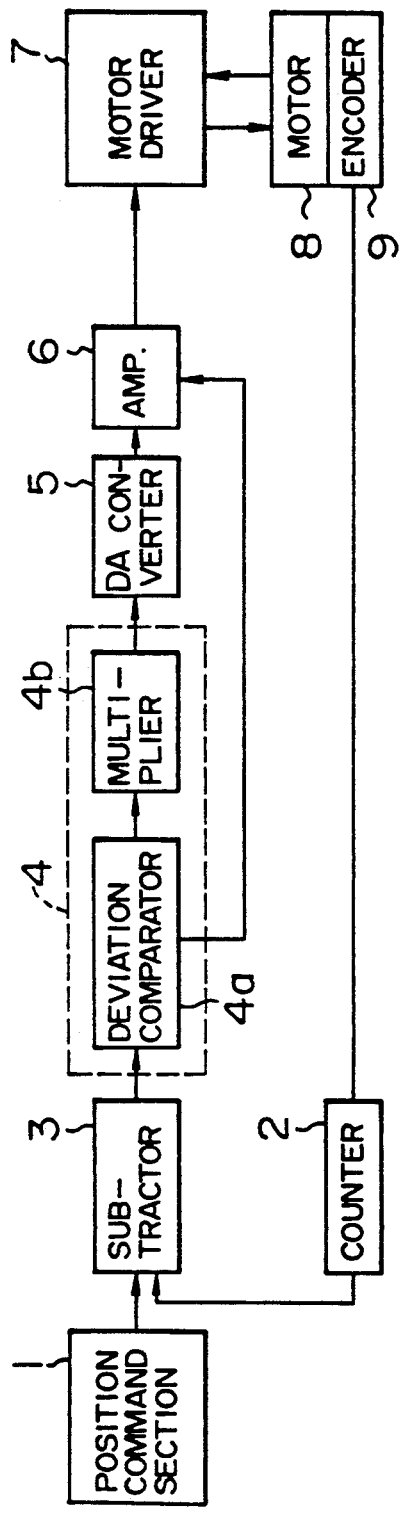
FIG. 1 is a block diagram illustrating a control system in a first embodiment of the present invention.

In FIG. 1, which shows a block diagram of a control system used for a robot control process in a first embodiment, there are shown a position command section 1, an up-down counter 2 for counting pulses delivered from an encoder 9, a subtractor 3 for performing subtraction between a command value delivered from the position command section 1 and a value counted by the counter 2 so as to obtain a positional deviation e which is a digital value, and a ROM table logic circuit 4 including a positional deviation comparator 4a for comparing the positional deviation e delivered from the subtractor 2 with two threshold values e1, e2 (refer to FIG. 3) and a multiplier 4b for multiplying the positional deviation with a value depending upon a result of comparison by the positional deviation comparator 4a. That is, if the positional deviation e is equal to or less than the first threshold value e1, the positional deviation e is multiplied by 1 while if it is greater than the first threshold value e1 but equal to or smaller than the second threshold value e2, it is multiplied by $\frac{1}{2}$, and if it is greater than the second threshold value e2, it is multiplied by $\frac{1}{4}$. The digital output of the multiplier 4b is then converted into an analog value ea by a DA converter 5, and a variable gain amplifier 6 amplifies the analog value ea with a gain which is changed depending upon a result of comparison by the positional deviation comparator 4a. A speed instructing type motor driver 7 receives the amplified analog value from the amplifier 6 and controls a motor 8 which rotates at a speed in proportion to the amplified analog value. The speed of the motor 8 is detected by the encoder 9 which delivers pulses to the up-down counter 2.

With the above-mentioned arrangement, a positional feed-back control for a direct-drive robot is carried out. More specifically, if the positional deviation is in a small value range, the positional deviation is multiplied by an integer number, and the thus obtained multiplied digital value is converted into an analog value which is then amplified by a decreased gain depending upon a result of comparison by the positional deviation comparator so as to obtain a speed instruction. On the other hand, if the positional deviation is in a large value range, the positional deviation is multiplied by a value less than 1, and the thus obtained multiplied digital value is converted into an analog value which is then amplified by an increased gain depending upon a result of comparison by the positional deviation comparator so as to obtain a speed instruction.

With this arrangement, it is possible to enhance the servo rigidity while restraining slight vibrations during stopping operation of the robot, and as well to realize smooth operation during movement thereof.

Figure 2:
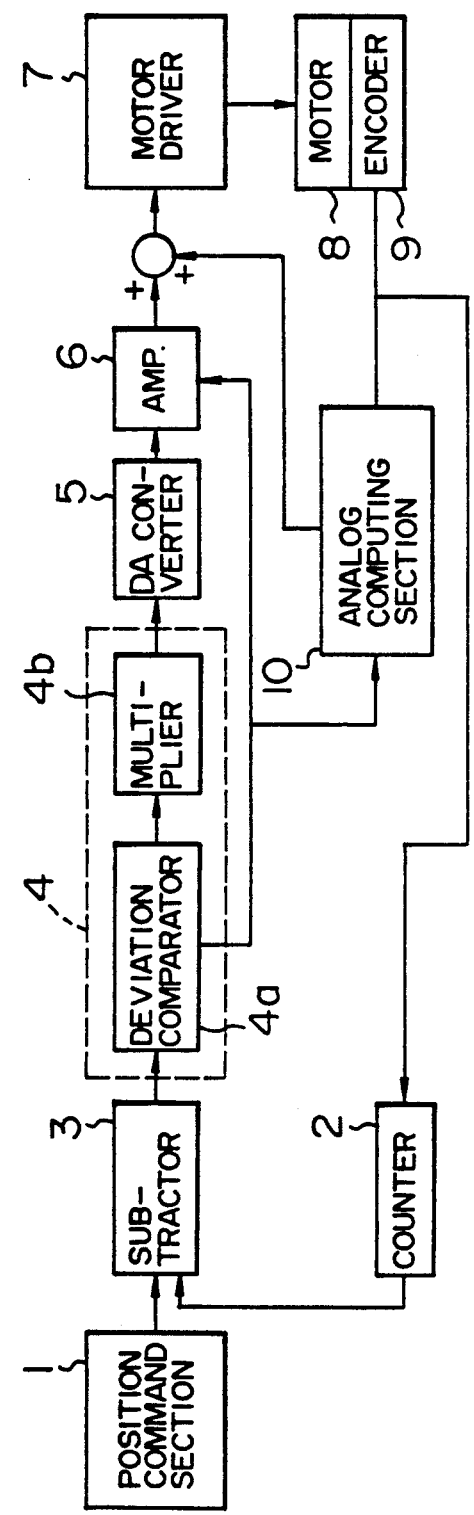
FIG. 2 is a block diagram illustrating a control system in a second embodiment of the present invention.

FIG. 2 shows a block diagram of a control system used for a robot control process in a second embodiment, in which like parts to those shown in FIG. 1 are denoted by like reference numerals, and explanation thereof will be omitted for the sake of brevity. In this embodiment, there is provided an analog computing section 10 which receives two sinusoidal signals A, B having different phases by 90 deg., and which computes the values of $A + B$, $-A + B$, $A - B$ and $-A - B$. These values are added to the speed instruction delivered from the variable gain amplifier 6, selectively in accordance with the condition of the sinusoidal signals A, B if the positional deviation is in a small value range.

Figure 4:
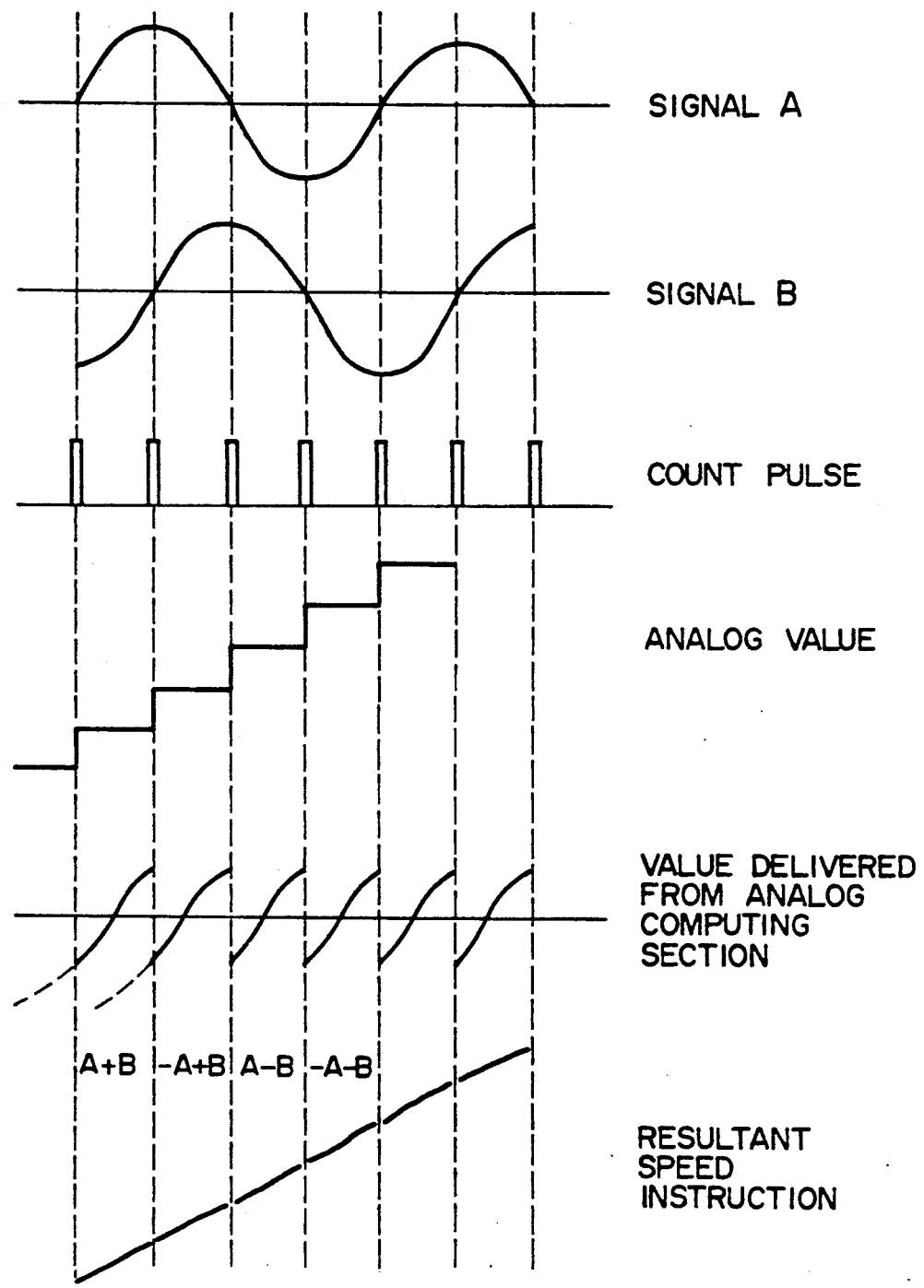
FIG. 4 is a graph explaining the relationship of signals delivered from components in the control system shown in FIG. 2.
Figure 5:
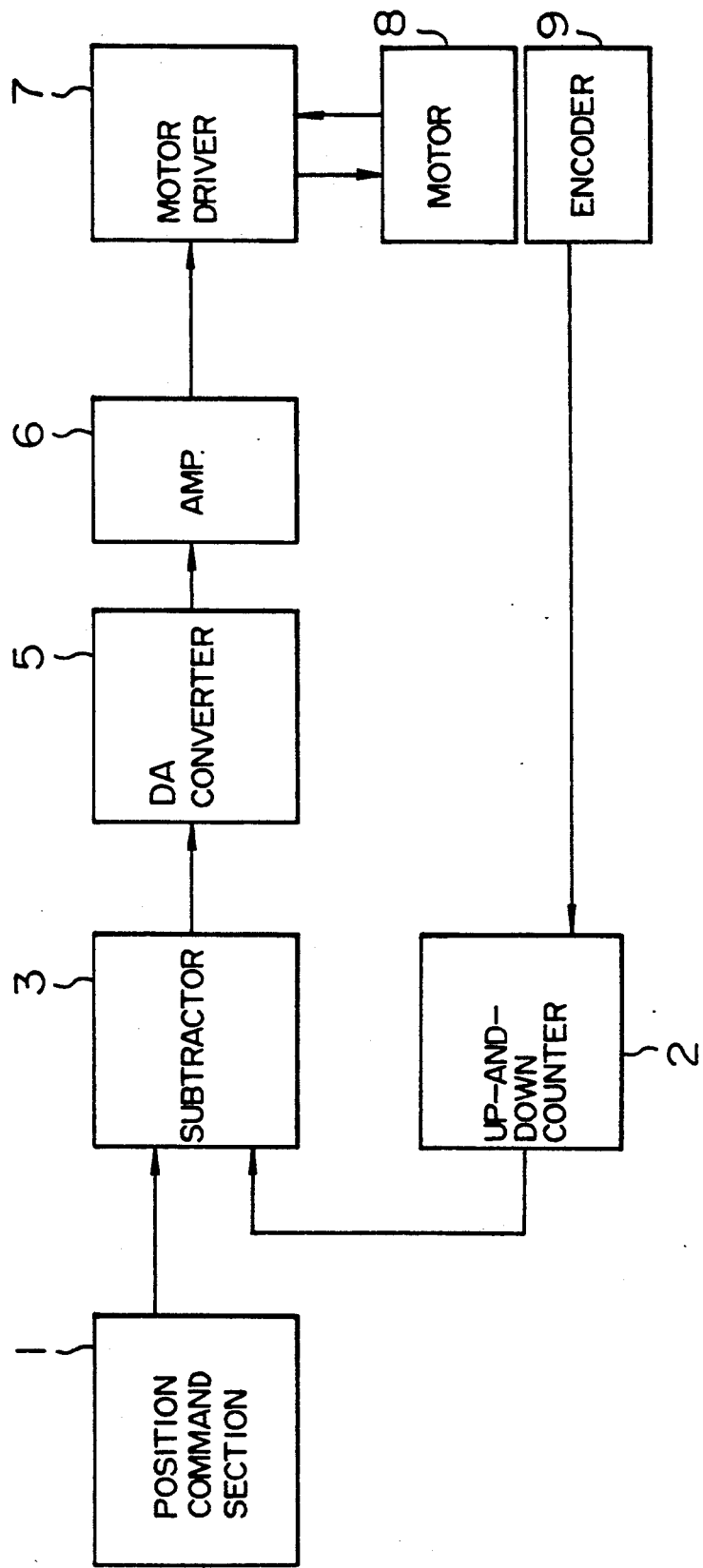
FIG. 5 is a block diagram illustrating a prior art control system.

That is, as shown in FIG. 4, the signals A, B obtained from the encoder 9 are chopped by count pulses and then thus obtained chopped fragments are added together so as to obtain the values of $A + B$, $-A + B$, $A - B$ and $-A - B$. Further, the thus obtained values are added respectively to the amplified analog values so as to obtain a substantially continuous analog signal which monotonously increases. This continuous signal is then delivered to the motor driver which can therefore smoothly drive the motor with enhanced servo rigidity and with restrained slight vibrations when the positional deviation is in the small value range.

What we claim is:

1. A process of controlling a robot having a direct drive section, a motor for directly driving said direct drive section, an encoder for detecting a motion of said direct drive section driven by said motor so as to deliver pulses, a motor driver for controlling the motion of said motor, an up-and-down counter for counting pulses from said encoder so as to deliver a count value, a subtractor for subtracting said count value from a position command value delivered from a position command section so as to deliver a digital positional deviation value, a converter for converting said digital positional deviation value into an analog value, and a variable gain amplifier for amplifying said analog value so as to obtain a motion instruction adapted to be delivered to said motor driver, comprising the steps of:

comparing said digital positional deviation value with a threshold value so as to determine whether said digital positional deviation value is greater than said threshold value or not;

multiplying said digital positional deviation value by a number which is greater than zero before the digital positional deviation value is subjected to digital-analog conversion in accordance with a result of said comparing step;

converting said multiplied digital positional deviation value into an analog value; and amplifying said analog value; and amplifying said analog value with a gain depending upon said result of said comparing step.

2. A process as set forth in claim 1, wherein said encoder delivers two sinusoidal signals having phases with a phase difference of 90 deg., then said sinusoidal signals are combined together in accordance with a condition of said signals so as to give a combined value, and said combined value is added to said amplified value.

* * * * *